May 12, 1936.　　　K. D. SMITH　　　2,040,537

VISCOLIZER VALVE

Filed July 1, 1935

INVENTOR.
Karl D. Smith
BY Chappell VEarl
ATTORNEYS

Patented May 12, 1936

2,040,537

UNITED STATES PATENT OFFICE 2,040,537

VISCOLIZER VALVE

Karl D. Smith, Battle Creek, Mich., assignor to Union Steam Pump Company, Battle Creek, Mich.

Application July 1, 1935, Serial No. 29,271

16 Claims. (Cl. 99—265)

The main objects of this invention are:

First, to provide an improved apparatus for homogenizing or viscolizing fluid, such as liquid dairy products, which is blow-proof and capable of withstanding extremely high pressure without leakage.

Second, to provide an improved viscolizer valve which is very efficient and effective in operation, the arrangement being such that undue viscosity in the viscolized material is avoided.

Third, to provide means in apparatus of the foregoing character for utilizing the cylinder block of the compressor as a casing for the valve.

Objects relating to details and economies of my invention will appear from the description to follow. The invention is defined and pointed out in the claims.

A structure which is a preferred embodiment of my invention is illustrated in the accompanying drawing, in which.

Figure 1:
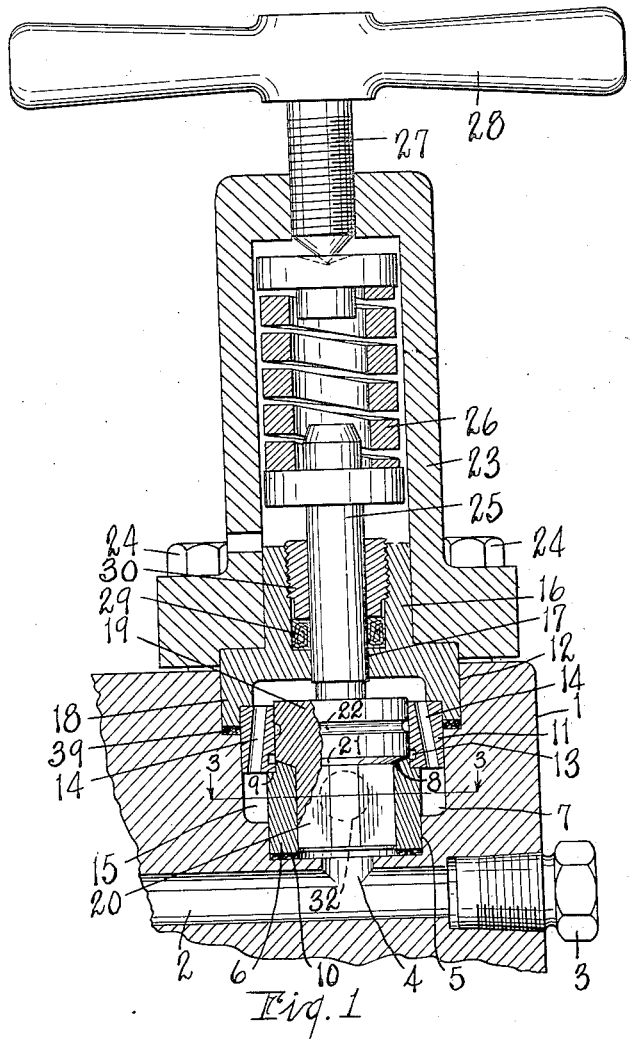
Fig. 1 is a view mainly in vertical section taken on line 1—1 of Fig. 3 of a viscolizing apparatus embodying features of my invention.
Figure 2:
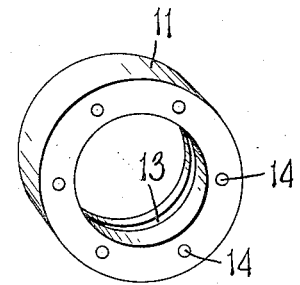
Fig. 2 is a perspective view of the cylindrical breaker ring.
Figure 3:
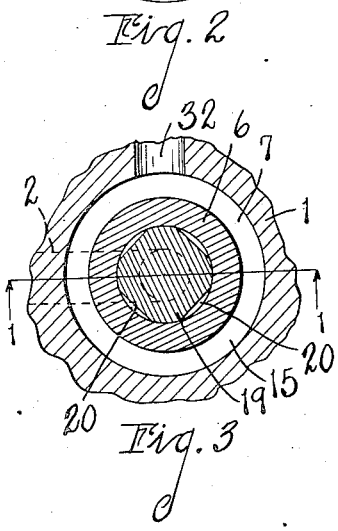
Fig. 3 is a fragmentary transverse section taken on line 3—3 of Fig. 1.

Referring to the drawing, 1 is the cylinder block of a compressor, the cylinder block having a cross passage 2 connected at its inner end to the pump cylinder (not shown), the outer end of the passage being closed by the plug 3. To utilize the cylinder block as a casing for my viscolizer valve, I provide the block with four stepped concentric bores of increasing diameters, the first and smallest bore 4 constituting a fluid delivery passage communicating with the cross passage 2 and through which the compressor delivers the fluid to be viscolized under pressure to the valve.

In the next larger or second bore 5, I mount a cylindrical valve seat member 6 which projects into the third bore 7, as shown, and has at its upper end an inner annular inclined valve seat 8 and an outer annular shoulder 9. To prevent leakage, packing 10 is disposed between the bottom of the second bore 5 and the lower end of the valve seat member 6. A cylindrical breaker ring 11 is telescoped within the third bore 7 and seated on the shoulder 9 of the valve seat member 6, the breaker ring projecting into the fourth and largest bore 12 and having an internal annular groove 13 laterally facing the valve seat 8 and downwardly and outwardly inclined wall passages 14 opening to the annular fluid discharge space 15 between the third bore 7 and the valve seat member 6.

A closure member 16 is fitted within the fourth and largest bore 12, the closure member having a central bore 17 and an annular shouldered flange 18 engaging the breaker ring 11, a packing 39 being disposed between the flange and the bottom of the bore 12. A valve 19 fits the breaker ring and valve seat member for longitudinal movement, the valve having longitudinal flutes 20 facing the valve seat member, an annular inclined face 21 coacting with the valve seat 8 and an annular groove 22 facing the breaker ring 11.

The stationary parts are clamped in place by means of the spring bonnet 23 and bolts 24 which are threaded to the cylinder block 1. The valve stem 25 extends through the central bore 17 of the closure member 16 and engages the top of the valve 19, the valve stem being actuated to urge the valve to closed position by means including the compression spring 26 disposed within the spring bonnet 23. The force of the spring 26 is regulated by the screw 27 threaded to the upper end of the bonnet and having a handle 28. Leakage around the valve stem 25 is prevented by the packing 29 and packing gland 30 which is threaded into the upper part of the closure member 16, as shown.

The foregoing arrangement is such that the apparatus may be readily disassembled for cleaning and sterilizing, the removable parts being preferably made of an acid resisting alloy such as rustless iron or, if desired, the removable parts may be plated with an acid resisting metal such as chromium. Chromium not only resists corrosion to a marked degree, but also is very hard and gives good service in an apparatus of this character.

Figure 4:
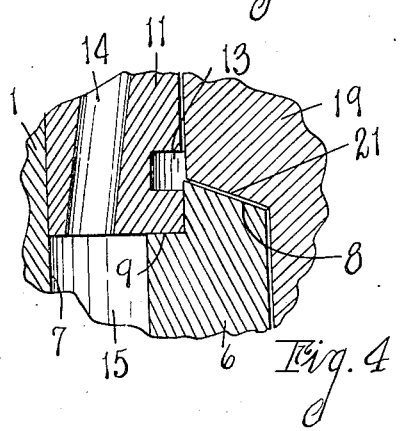
Fig. 4 is an enlarged fragmentary detail section similar to Fig. 1, showing the valve in open position.

In operation, the material to be viscolized is delivered by the compressor under high pressure to the bottom of the valve 19 through the delivery passages 2 and 4. The pressure of the fluid is such that the valve 19 is lifted against the force of the spring 26, as shown by Fig. 4, the fluid escaping through the space between the valve seat 8 and the face 21 expanding against the interior of the groove 13 of the breaker ring with great force. The fluid thereupon is forced upwardly through the restricted space between the valve and breaker ring, the groove 22 breaking up such movement to a certain extent. The material then passes through the annular space 31 downwardly through the inclined passages 14 into the annular space 15, and finally out through the discharge port 32 in the cylinder block. The fluid is thus thoroughly viscolized without undue viscosity owing to the various changes of direction and restricted passages through which it passes in traveling through the apparatus.

With my arrangement of parts, wherein the cylinder block of the compressor is utilized as a casing for the viscolizer valve, the device is capable of withstanding extremely high pressures and is substantially blow-proof. Further, my apparatus is simple and economical in its parts and very efficient and effective for the purpose intended. It is well adapted for viscolizing liquids of an organic and inorganic nature.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Although I have shown and described a certain specific embodiment of my invention, I am fully aware that many modifications thereof are possible. My invention is, therefore, not to be restricted except insofar as is necessitated by the prior art and by the spirit of the appended claims.

Having thus described my invention, what I claim as new and desire to secure by Letters Patent, is:

1. In a viscolizer, the combination of a compressor having a cylinder block provided with four stepped concentric bores of increasing diameter, the first and smallest bore constituting a fluid delivery passage through which the compressor delivers the fluid under pressure, a cylindrical valve seat member mounted in the next larger or second bore and projecting into the third bore, packing being disposed between the bottom of said second bore and the lower end of said valve seat member, the upper end of said valve seat member having an inner annular inclined valve seat and an outer annular shoulder, a cylindrical breaker ring telescoped within said third bore and seated on said shoulder, the breaker ring projecting into the fourth and largest bore and having an internal annular groove laterally facing said valve seat and downwardly and outwardly inclined wall passages opening to an annular fluid discharge space between said third bore and said valve seat member, a closure member fitting said fourth bore and having a central bore and an annular shouldered flange engaging said breaker ring, packing being disposed between said flange and the bottom of said fourth bore, a valve fitting said breaker ring and valve seat member for longitudinal movement and having longitudinal flutes facing said valve seat member, an annular inclined face coacting with said valve seat, and an annular groove facing said breaker ring, a spring actuated valve stem extending through said central bore and engaging said valve, and a spring bonnet engaging said closure member and bolted to said cylinder block to clamp said breaker ring and valve seat member in place.

2. In a viscolizer, the combination of a compressor having a cylinder block provided with stepped concentric bores of increasing diameter, the first and smallest bore constituting a fluid delivery passage through which the compressor delivers the fluid under pressure, a cylindrical valve seat member mounted in the next larger or second bore and projecting into the third bore, the upper end of said valve seat member having an inner annular inclined valve seat and an outer annular shoulder, a cylindrical breaker ring telescoped within said third bore and seated on said shoulder, the breaker ring projecting into the fourth and largest bore and having an internal annular groove laterally facing said valve seat and downwardly and outwardly inclined wall passages opening to an annular fluid discharge space between said third bore and said valve seat member, a closure member fitting said fourth bore and having a central bore and an annular shouldered flange engaging said breaker ring, a valve fitting said breaker ring and valve seat member for longitudinal movement and having longitudinal flutes facing said valve seat member, an annular inclined face coacting with said valve seat, and an annular groove facing said breaker ring, a spring actuated valve stem extending through said central bore and engaging said valve, and a spring bonnet engaging said closure member and bolted to said cylinder block to clamp said breaker ring and valve seat member in place.

3. In a viscolizer valve, the combination of a casing member provided with stepped concentric bores of increasing diameter, the first and smallest bore constituting a fluid delivery passage through which fluid under pressure is delivered to the valve, a cylindrical valve seat member mounted in the next larger or second bore and projecting into the third bore, packing being disposed between the bottom of said second bore and the lower end of said valve seat member, the upper end of said valve seat member having an inner annular inclined valve seat and an outer annular shoulder, a cylindrical breaker ring telescoped within said third bore and seated on said shoulder, the breaker ring projecting into the fourth and largest bore and having an internal annular groove laterally facing said valve seat and downwardly and outwardly inclined wall passages opening to an annular fluid discharge space between said third bore and said valve seat member, a closure member fitting said fourth bore and having a central bore and an annular shouldered flange engaging said breaker ring, packing being disposed between said flange and the bottom of said fourth bore, a valve fitting said breaker ring and valve seat member for longitudinal movement and having longitudinal flutes facing said valve seat member, an annular inclined face coacting with said valve seat, and an annular groove facing said breaker ring, a spring actuated valve stem extending through said central bore and engaging said valve, and means acting to clamp together the parts except said valve and valve stem, said means including a spring bonnet.

4. In a viscolizer valve, the combination of a casing member provided with stepped concentric bores of increasing diameter, the first and smallest bore constituting a fluid delivery passage through which fluid under pressure is delivered to the valve, a cylindrical valve seat member mounted in the next larger or second bore and projecting into the third bore, the upper end of said valve seat member having an inner annular inclined valve seat and an outer annular shoulder, a breaker ring telescoped within said third bore and seated on said shoulder, the breaker ring projecting into the fourth and largest bore and having an internal annular groove laterally facing said valve seat and downwardly and outwardly inclined wall passages opening to an annular fluid discharge space between said third bore and said valve seat member, a closure member fitting said fourth bore and having a central bore and an annular shouldered flange engaging said breaker ring, a valve fitting said breaker ring and valve seat member for longitudinal movement and having longitudinal flutes facing said valve seat member, an annular inclined face coacting with said valve seat, and an annular groove facing said breaker ring, a spring actuated valve stem extending through said central bore and engaging said valve, and means acting to clamp together the parts except said valve and valve stem.

5. In a viscolizer, the combination of a compressor having a cylinder block provided with four stepped concentric bores of increasing diameter, the first and smallest bore constituting a fluid delivery passage through which the compressor delivers the fluid under pressure, a cylindrical valve seat member mounted in the next larger or second bore and projecting into the third bore, packing being disposed between the bottom of said second bore and the lower end of said valve seat member, the upper end of said valve seat member having an inner annular inclined valve seat and an outer annular shoulder, a cylindrical breaker ring telescoped within said third bore and seated on said shoulder, the breaker ring projecting into the fourth and largest bore and having an internal annular groove laterally facing said valve seat and downwardly and outwardly inclined wall passages opening to an annular fluid discharge space between said third bore and said valve seat member, a closure member fitting said fourth bore and having a central bore and an annular shouldered flange engaging said breaker ring, packing being disposed between said flange and the bottom of said fourth bore, a valve fitting said breaker ring and valve seat member for longitudinal movement and having longitudinal flutes facing said valve seat member, an annular inclined face coacting with said valve seat, and an annular groove facing said breaker ring, and a spring actuated valve stem extending through said central bore and engaging said valve.

6. In a viscolizer, the combination of a cylindrical valve seat member, the upper end of said valve seat member having an inner annular inclined valve seat and an outer annular shoulder, a cylindrical breaker ring seated on said shoulder and having an internal annular groove laterally facing said valve seat and downwardly and outwardly inclined wall passages opening to a discharge, a closure member having a central bore and an annular shouldered flange engaging said breaker ring, a valve fitting said breaker ring and valve seat member for longitudinal movement and having longitudinal flutes facing said valve seat member, an annular inclined face coacting with said valve seat, and an annular groove facing said breaker ring, and a spring actuated valve stem extending through said central bore and engaging said valve.

7. In a viscolizer, the combination of valve seat member, the upper end of said valve seat member having an inner annular valve seat and an outer annular shoulder, a breaker ring seated on said shoulder and having an internal annular groove laterally facing said valve seat and downwardly and outwardly inclined wall passages opening to a discharge, a closure member having a central bore and an annular shouldered flange engaging said breaker ring, and a spring closed valve fitting said breaker ring and valve seat member for longitudinal movement and having longitudinal flutes facing said valve seat member, an annular face coacting with said valve seat, and an annular groove facing said breaker ring.

8. In a viscolizer, the combination of a valve seat member having a valve seat at its inner end, a breaker ring having an internal annular groove facing said valve seat and longitudinal fluid outlet wall passages, a spring closed valve fitting said valve seat member and breaker ring for longitudinal movement, and an end member acting to direct the fluid from said valve to said wall passages, there being inlet flutes between said valve seat member and said valve leading to said valve seat, and an annular groove between said valve and breaker ring above said first named groove.

9. In a viscolizer, the combination of a valve seat member having a valve seat at its inner end, a breaker ring having an internal annular groove facing said valve seat and longitudinal fluid outlet wall passages, a valve fitting said valve seat member and breaker ring for longitudinal movement, and an end member acting to direct the fluid from said valve to said wall passages, there being inlet flutes between said valve seat member and said valve leading to said valve seat.

10. In a viscolizer valve, the combination of a valve casing, an annular valve seat member seated therein and having an inwardly beveled valve seat and an outwardly facing annular shoulder, an annular breaker ring seated on said shoulder and provided with a plurality of longitudinal passages opening at its ends and having an annular groove facing the valve seat, and a valve coacting with said valve seat and fitting within said breaker ring to permit restricted passage of fluid between the valve and the breaker ring, said valve having an annular groove below the upper end of the breaker ring, the valve casing having an opening discharging below said breaker ring.

11. In a viscolizer valve, the combination of a valve casing, an annular valve seat member seated therein and having an inwardly beveled valve seat and an outwardly facing annular shoulder, an annular breaker ring seated on said shoulder and provided with a plurality of longitudinal passages opening at its ends, and a valve coacting with said valve seat and fitting within said breaker ring to permit restricted passage of fluid between the valve and the breaker ring, said valve having an annular groove below the upper end of the breaker ring, the valve casing having an opening discharging below said breaker ring.

12. In a viscolizer valve, the combination of a valve casing, an annular valve seat, an annular breaker ring provided with a plurality of longitudinal passages opening at its ends and having an annular groove facing the valve seat, and a valve coacting with said valve seat and fitting within said breaker ring to permit restricted passage of fluid between the valve and the breaker ring, said valve having an annular groove below the upper end of the breaker ring, the valve casing having an opening discharging below said breaker ring.

13. In a viscolizer valve, the combination of a valve casing, an annular valve seat member seated therein and having an inwardly beveled valve seat and an outwardly facing annular shoulder, an annular breaker ring seated on said shoulder and provided with a plurality of longitudinal passages opening at its ends and having an annular groove facing the valve seat, and a valve coacting with said valve seat and fitting within said breaker ring to permit restricted passage of fluid between the valve and the breaker ring, the valve casing having an opening discharging below said breaker ring.

14. In a viscolizer valve, the combination of a valve casing, an annular valve seat, an annular breaker ring provided with a plurality of longitudinal passages opening at its ends and having an anular groove facing the valve seat, and a valve coacting with said valve seat and fitting within said breaker ring to permit restricted passage of fluid between the valve and the breaker ring, the valve casing having an opening discharging below said breaker ring.

15. In a viscolizer valve, the combination of a valve casing, an annular valve seat member seated therein and having an inwardly beveled valve seat and an upwardly facing annular shoulder, an annular breaker ring having an annular groove facing the valve seat, and a valve coacting with said valve seat and fitting within said breaker ring to permit restricted passage of fluid between the valve and the breaker ring, said valve having an annular groove below the upper end of the breaker ring.

16. In a viscolizer valve, the combination of a valve casing, an annular valve seat member seated therein and having an inwardly beveled valve seat and an upwardly facing annular shoulder, an annular breaker ring having an annular groove facing the valve seat, and a valve coacting with said valve seat and fitting within said breaker ring to permit restricted passage of fluid between the valve and the breaker ring.

KARL D. SMITH.